US012249730B2

(12) United States Patent
Cadio (10) Patent No.: US 12,249,730 B2
(45) Date of Patent: Mar. 11, 2025

(54) DUAL ACTION DOOR MECHANISM FOR A BATTERY COMPARTMENT

(71) Applicant: Roche Diabetes Care, Inc., Indianapolis, IN (US)

(72) Inventor: Michel A. Cadio, Carmel, IN (US)

(73) Assignee: Roche Diabetes Care, Inc., Indianapolis, IN (US)

( * ) Notice: Subject to any disclaimer, the term of this patent is extended or adjusted under 35 U.S.C. 154(b) by 824 days.

(21) Appl. No.: 17/374,300

(22) Filed: Jul. 13, 2021

(65) Prior Publication Data

US 2021/0344078 A1 Nov. 4, 2021

Related U.S. Application Data

(63) Continuation of application No. PCT/US2020/012655, filed on Jan. 8, 2020.

(60) Provisional application No. 62/791,960, filed on Jan. 14, 2019.

(51) Int. Cl.
*E05C 19/06* (2006.01)
*H01M 50/262* (2021.01)
*H01M 50/271* (2021.01)
*E05B 15/04* (2006.01)

(52) U.S. Cl.
CPC ....... *H01M 50/271* (2021.01); *H01M 50/262* (2021.01); *E05B 2015/0468* (2013.01); *E05C 19/06* (2013.01)

(58) Field of Classification Search
CPC .... Y10S 292/37; Y10S 292/38; Y10S 292/63; Y10T 292/0902; Y10T 292/0956; Y10T 292/1089; Y10T 292/1091; Y10T 292/0907; E05B 2015/0468; E05B 2015/0472; E05C 1/085; E05C 19/06
USPC ......... 429/96, 97, 100; 292/80–91, 145–154, 292/202–211
See application file for complete search history.

(56) References Cited

U.S. PATENT DOCUMENTS

| 138,360 | A | * | 4/1873 | Arnold | ................ | E05B 65/0864 |
| | | | | | | 292/153 |
| 335,960 | A | * | 2/1886 | Reaser | .................... | E05C 19/06 |
| | | | | | | 292/130 |
| 419,846 | A | * | 1/1890 | Gamble | .................... | E05B 7/00 |
| | | | | | | 27/DIG. 1 |

(Continued)

FOREIGN PATENT DOCUMENTS

| GB | 2187787 A | * | 9/1987 | ......... A45C 13/1084 |
| GB | 2244082 A | * | 11/1991 | ............. E05C 19/06 |

(Continued)

OTHER PUBLICATIONS

International Search Report and Written Opinion, issued May 12, 2020 in Application No. PCT/US2020/012655.

*Primary Examiner* — Carlos Lugo (57) ABSTRACT

A lock mechanism for a compartment has been developed. The lock mechanism includes a deformable arm affixed to a housing of the compartment and positioned within the compartment. The deformable arm includes a first end configured to be biased into a first position to engage a latch of a door of the compartment to prevent the latch from opening, and a receiving surface configured to receive an external force to move the deformable arm to a second position that disengages the first end from the latch to enable opening of the latch while the external force is applied to the receiving surface.

17 Claims, 8 Drawing Sheets

(56) References Cited

U.S. PATENT DOCUMENTS

| | | | | |
|---|---|---|---|---|
| 487,314 A * | 12/1892 | Wolcott | E05F 11/00 | 292/210 |
| 590,818 A * | 9/1897 | Blackburn | E05C 19/10 | 292/105 |
| 930,534 A * | 8/1909 | Cox | E05C 3/24 | 292/213 |
| 1,050,899 A * | 1/1913 | Yaeger | E05C 19/06 | 292/DIG. 20 |
| 1,147,921 A * | 7/1915 | Berry | E05B 47/0002 | 292/210 |
| 1,235,075 A * | 7/1917 | Stamm | E05C 19/06 | 292/88 |
| 1,253,474 A * | 1/1918 | Voe | E05F 11/00 | 292/210 |
| 1,263,358 A * | 4/1918 | Anderson | E05F 11/00 | 292/210 |
| 1,501,798 A * | 7/1924 | Morrison | A45C 13/1084 | 220/DIG. 26 |
| 1,520,509 A * | 12/1924 | Rancour | E05B 17/2019 | 292/89 |
| 1,685,508 A * | 9/1928 | Stuart | E05C 1/14 | 292/168 |
| 1,808,621 A * | 6/1931 | Wetmore | E05C 17/64 | 292/228 |
| 2,146,379 A * | 2/1939 | Rediger | E05C 3/24 | 292/207 |
| 2,682,423 A * | 6/1954 | Ashworth | E05C 19/06 | 292/87 |
| 3,519,298 A * | 7/1970 | Gley | E05C 19/14 | 292/108 |
| 4,023,839 A * | 5/1977 | Bisbing | E05C 3/30 | 292/85 |
| 5,158,329 A * | 10/1992 | Schlack | E05C 19/06 | 292/87 |
| 5,225,293 A * | 7/1993 | Mitchell | G06F 1/1635 | 429/97 |
| 5,722,705 A | 3/1998 | Deguchi | | |
| 5,793,619 A * | 8/1998 | Deguchi | H04B 1/3883 | 292/99 |
| 6,189,938 B1 * | 2/2001 | Nakadaira | E05C 19/06 | 292/87 |
| 6,212,366 B1 | 4/2001 | Cheraso | | |
| 6,394,300 B1 | 5/2002 | Bosy | | |
| 6,752,437 B1 * | 6/2004 | Bantle | E05C 3/162 | 292/53 |
| 6,921,227 B1 * | 7/2005 | De Jong | F16B 2/241 | 403/321 |
| 7,969,731 B2 * | 6/2011 | Yang | G06F 1/1679 | 361/679.55 |
| 8,322,760 B2 | 12/2012 | Wu et al. | | |
| 8,360,485 B2 * | 1/2013 | Ma | H05K 5/0221 | 429/97 |
| 11,592,875 B2 * | 2/2023 | Kong | E05C 3/048 | |

FOREIGN PATENT DOCUMENTS

| | | |
|---|---|---|
| JP | 11237930 A | 8/1999 |
| WO | 9850281 | 11/1998 |

\* cited by examiner

DUAL ACTION DOOR MECHANISM FOR A BATTERY COMPARTMENT

CLAIM OF PRIORITY

This application claims the benefit of International Application No. PCT/US2020/012655, which is entitled "DUAL ACTION DOOR MECHANISM FOR A BATTERY COMPARTMENT," and was filed on 8 Jan. 2020, the entire contents of which are hereby incorporated herein by reference. This application further claims the benefit of U.S. Provisional Application No. 62/791,960, which is entitled "DUAL ACTION DOOR MECHANISM FOR A BATTERY COMPARTMENT," and was filed on 14 Jan. 2019, the entire contents of which are hereby incorporated herein by reference.

TECHNICAL FIELD

This disclosure is related to mechanisms that secure doors of compartments and, more particularly, for a dual action mechanism for the door of a compartment that includes a lock mechanism for a latch of the door.

BACKGROUND

Battery powered electronic devices are used in a wide range of applications. Examples of common battery types used in electronic devices include, but are not limited to, 6-volt and 9-volt batteries that have a rectangular prism form factor, cylindrical C, D, AA, and AAA battery cells, and various types of circular coin cell batteries. Some devices employ a battery pack that integrates two or more cells into a single electrical energy supply. More generally the term "battery" refers to one or more battery cells that store the electrical energy that an electronic device uses in operation. The electronic device includes a battery compartment that physically secures the battery and provides the electrical connection for the battery to provide power to the electronic device.

Many electronic devices provide access to the battery compartment to enable replacement of batteries via a door that secures the battery compartment when closed and that provides access to the battery compartment when opened. In some battery compartment configurations, the door also engages the battery with a physical connection, electrical connection, or both, when closed, while in other configurations the door only controls access to the battery compartment.

Existing battery compartment doors enable a user to access the battery compartment to replace batteries, but in some instances an unauthorized user, such as a child, may be able to open the door to access the battery compartment as well. A child who gains unsupervised access to the battery in the compartment could be injured after removing the battery from the compartment. Of course, various lock mechanisms including keyed locks and doors that are secured by screws are known to the art and are generally effective in preventing unauthorized access. However, these mechanisms may also make it difficult for an authorized user to access the battery compartment for legitimate purposes such as changing the battery after the existing battery is discharged. In some circumstances, such as medical monitoring devices, an authorized user may need to change the batteries with minimal difficulty while the device should still prevent unauthorized access to the battery compartment. Consequently, improvements to lock mechanisms for compartment doors, including battery compartment doors, that reduce or eliminate these problems would be beneficial.

SUMMARY

In one embodiment, a lock mechanism for a compartment has been developed. The lock mechanism includes a deformable arm affixed to a housing of the compartment and positioned within the compartment. The deformable arm includes a first end configured to be biased into a first position to engage a latch of a door of the compartment to prevent the latch from opening and a receiving surface configured to receive an external force to move the deformable arm to a second position that disengages the first end from the latch to enable opening of the latch while the external force is applied to the receiving surface.

In another embodiment, a compartment with a lock mechanism includes a housing forming the compartment, an opening in the housing providing access to the compartment, and a door configured to engage the opening in the housing to prevent access to the compartment when closed and to provide access to the compartment when opened. The door further includes a latch, the latch includes a latch member configured to move between a latched position to hold the door closed in engagement with the housing and an unlatched position to enable the door to be opened and a deformable arm affixed to the housing of the compartment and positioned within the compartment. The deformable arm includes a first end configured to be biased into a first position to engage the latch to prevent the latch from moving from the latched position to the unlatched position, and a receiving surface configured to receive an external force to move the deformable arm to a second position that disengages the first end from the latch to enable the latch to be moved to the unlatched position while the external force is applied to the receiving surface.

DETAILED DESCRIPTION

For the purposes of promoting an understanding of the principles of the embodiments described herein, reference is now made to the drawings and descriptions in the following written specification. No limitation to the scope of the subject matter is intended by the references. This patent also includes any alterations and modifications to the illustrated embodiments and includes further applications of the principles of the described embodiments as would normally occur to one skilled in the art to which this document pertains.

Figure 1:
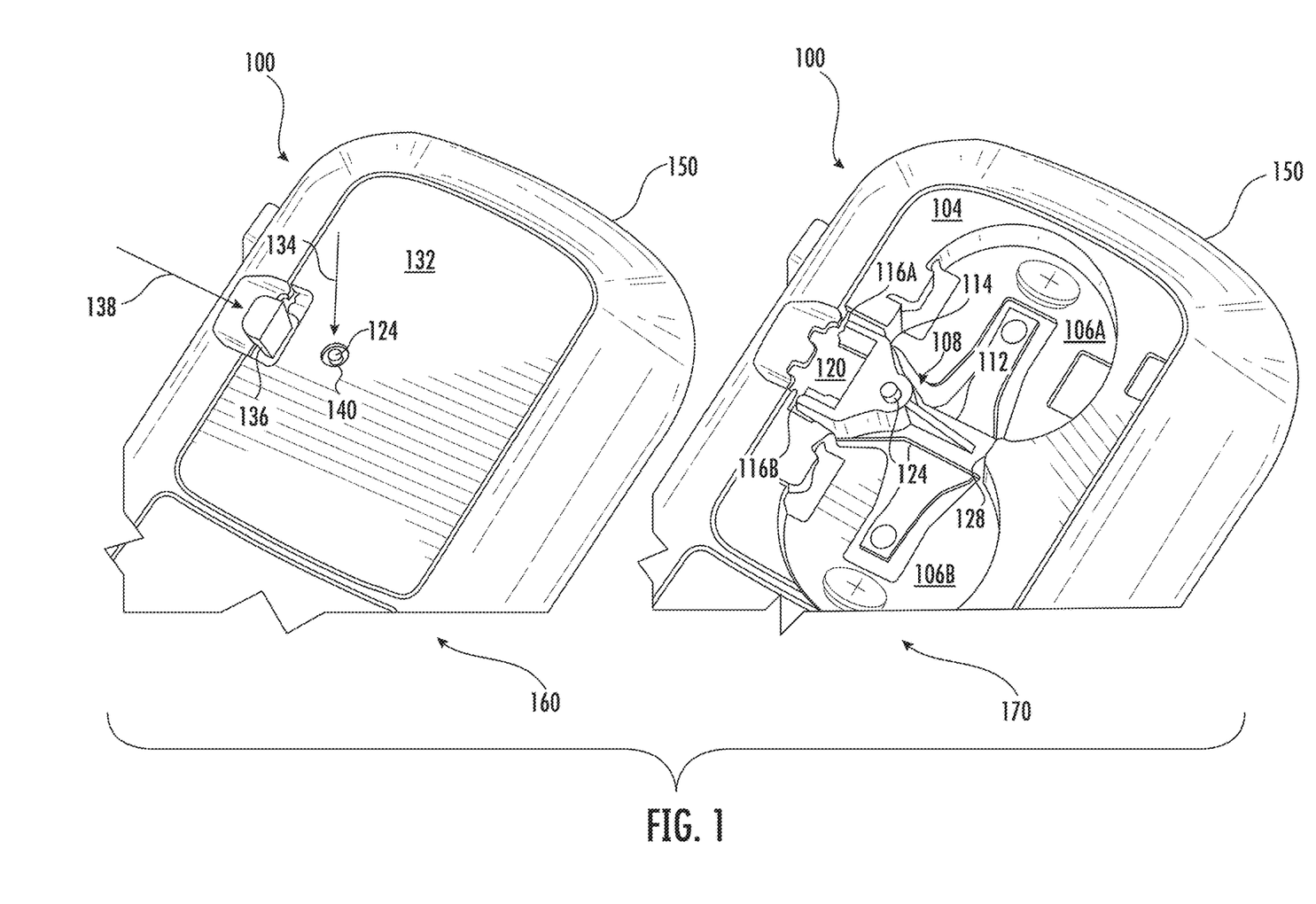
FIG. 1 is a set of views of a battery compartment that includes a dual action door mechanism including a lock mechanism in a configuration in which a closed door prevents access to the compartment and another configuration in which the door is opened to provide access to the compartment.

FIG. 1 depicts an electronic device 100 with a housing 150 that forms a compartment 104 with an opening that accepts a door 132 and that includes a lock mechanism 108. The lock mechanism 108 includes a deformable arm 112 that engages a latch 136 formed in the door 132. In view 160 the door 132 is closed to prevent access to the compartment 104, while in view 170 the door is opened to enable access to the compartment. While FIG. 1 depicts a door 132 that is fully removable from the housing 150 of the compartment 104, in alternative embodiments an opened door remains attached to the housing using a hinge or other attachment structure and the lock mechanism 108 can be used with both removable and non-removable doors. As described in further detail below, the deformable arm 112 biases into a first position to enable a first end 114 of the deformable arm 112 to engage the latch 136 in a locked configuration. An external force that is applied to the deformable arm 112 moves the deformable arm 112 to a second unlocked position in which the first end 114 of the deformable arm does not engage the latch 136, which then enables the latch 136 to be opened while the deformable arm 112 is placed in the second position.

For illustrative purposes, the electronic device 100 is an electronic blood glucose meter (BGM) device, and the compartment 104 is a battery compartment that includes receptacles 106A and 106B for two coin-cell batteries that supply power for operation of the device. However, the embodiments described herein may be used with a wide range of other electronic devices that use a battery compartment including battery compartments that accept different types and numbers of battery cells or battery packs. Furthermore, while the embodiments described herein depict a battery compartment, the dual action door mechanism with the lock mechanism described herein can be used to secure compartments that hold items other than batteries as well.

View 160 of FIG. 1 depicts the door 132 in a closed and locked configuration that prevents access to the compartment 104. In addition to the latch 136, the door 132 includes an opening 140 that provides access to a receiving surface 124 formed on the deformable arm 112 of the lock mechanism 108. As depicted in both views 160 and 170 of FIG. 1, the receiving surface 124 is a button (also referred to as a "pin") that extends from the deformable arm 112. In the embodiment of FIG. 1 the receiving surface button 124 is formed flush with the opening 140 in the door 132, but in other embodiments the receiving surface is recessed below the opening 140 or the button 124 or the receiving surface structure extends through the opening 140. In an alternative embodiment, the receiving surface is a flat portion of the deformable arm 112 or a structure with a different shape and size that enables an external force to move the deformable arm from the first position to the second position to unlock the latch 136. Embodiments that place the receiving surface flush with or below the opening 140 reduce or eliminate the ability of a user to unlock the latch 136 manually without the use of a pen or other implement to engage the deformable arm 112 through the opening 140, which can aid in preventing unauthorized access by a child. Additionally, while the embodiments described herein include an opening 140 that is formed in the door 132, in alternative embodiments the opening can be formed in at least one of the housing that forms the compartment or the door.

During operation, an external force pushes on the receiving surface of the button 124 as indicated by arrow 134. In the illustrative embodiment of FIG. 1, a user applied the external force using, for example, an implement such as the tip of a ballpoint pen, tweezers, or other similar object to push on the button 124 and move the deformable arm 112 to the second position that is out of engagement with the latch 136. The implement need not be a specific tool, such as a specific type of screwdriver, and can be an object that is easily available to the user. Additionally, in some embodiments the button 124 is configured to enable manual operation (i.e. operation with one or more fingers) that does not require the use of an implement.

The external force that moves the deformable arm 112 to the second position enables the user to operate the latch 136 by applying a separate force as indicated by arrow 138 while simultaneously keeping the deformable arm 112 in the unlocked position via application of the external force in direction 134. The door 132 unlatches and is removed from the housing 150 to enable access to the compartment 104. Thus, FIG. 1 and the other embodiments described herein depict a "dual action door mechanism" because the process to open the door to the compartment includes a first action to unlock the lock mechanism and a second action to open the latch while the lock mechanism remains in the unlocked configuration.

View 170 of FIG. 1 depicts the compartment 104 in an opened configuration with the door 132 removed. In the view 170, the deformable arm 112 of the lock mechanism 108 biases the first end 114 of the deformable arm 112 that includes the first projection 116A and the second projection 116B into the first position when the external force is not applied to the receiving surface button 124. A second end 128 of the deformable arm 112 is affixed to the housing 150 that forms the compartment 104. In the embodiments described herein the deformable arm 112 is an integrated member that is formed as a molded portion of the housing 150, while in other embodiments the deformable arm 112 is a separate structure that is affixed to the housing via welding, riveting, a friction fit connection, or any other suitable attachment structure. The deformable arm 112 is a type of spring. More particularly, the deformable arm 112 forms a cantilever spring in which the first end 114 with the projections 116A and 116B is a free end and the second end 128 forms a fixed end. In the embodiments described herein, the second end 128 also forms the fulcrum of the cantilever spring, but alternative embodiments can employ a fulcrum that is separate from the attachment location of the second end 128 of the deformable arm 112.

As depicted in view 170 of FIG. 1, the first end 114 of the deformable arm 112 includes the projections 116A and 116B that are configured to engage a first barb and a second barb, respectively, that are formed in the latch 136. The projections 116A and 116B engage the barbs while the deformable arm 112 is in the first position to lock the latch 136 and prevent the latch 136 from being opened. The barbs are depicted in greater detail below. The first projection 116A is offset from the second projection 116B to form a gap 120 that enables a deformable member in the latch 136 to be positioned between the first projection 116A and the second projection 116B so that the latch 136 can be opened when the projections 116A and 116B disengage from the barbs when the deformable arm 112 is moved to the second position. Alternative embodiments of the deformable arm 112 can include one or more projections or other members that engage the latch.

Figure 2:
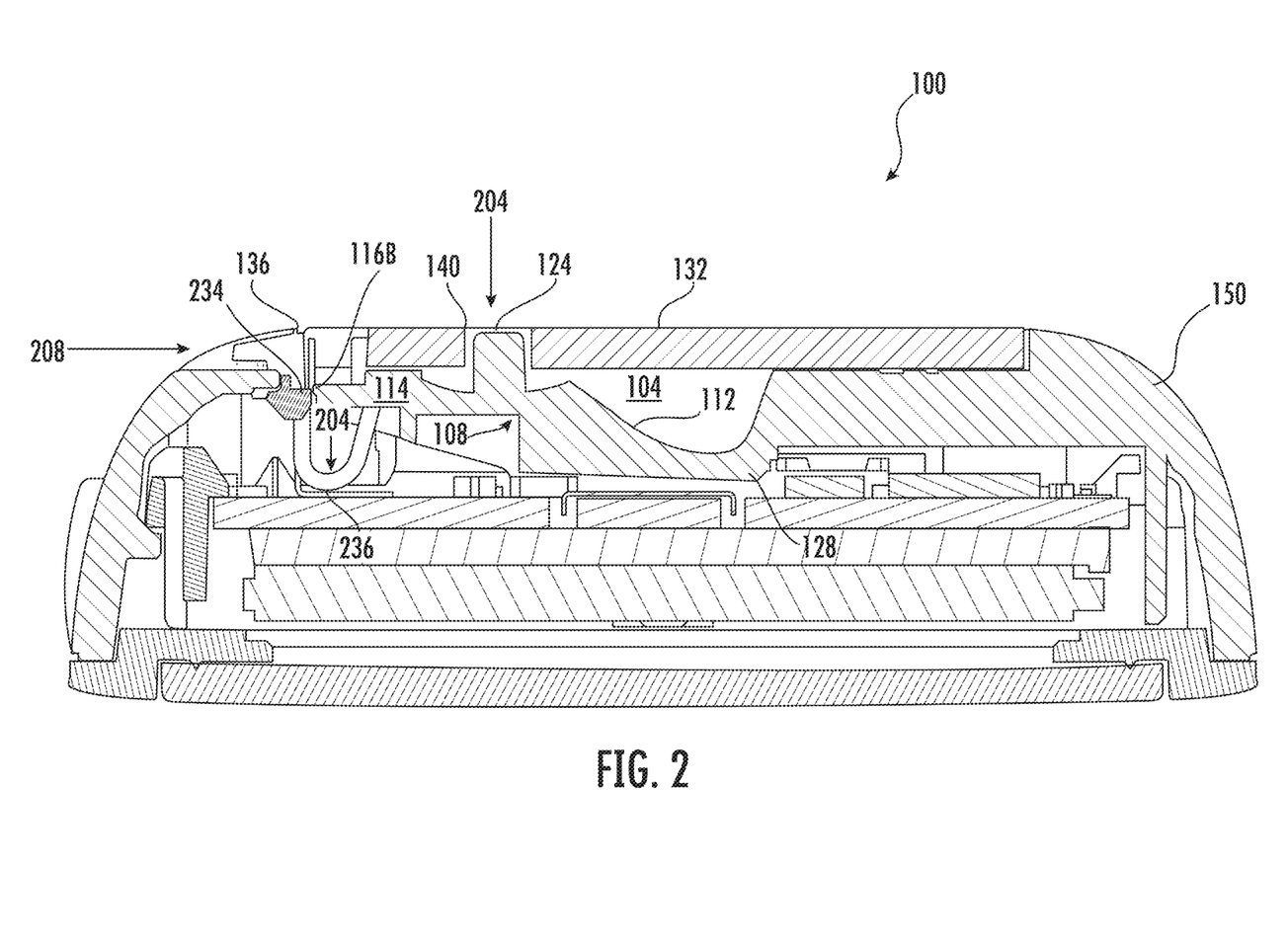
FIG. 2 is a sectional view of a lock mechanism that secures a door to a compartment.

FIG. 2 depicts an interior view within the compartment 104 while door 132 is closed and the deformable arm 112 of the lock mechanism 108 is in the first position to prevent the latch 136 from being opened. FIG. 2 depicts additional elements of the latch 136 including a barb 234 and a U-shaped deformable member 236. One end of the U-shaped deformable member 236 is affixed to the door 132 and the other end is a free end that engages the housing 150 when the door 132 is closed. The barb 234 extends laterally from the deformable member 236 in the latch 136 and engages the projection 116B from the deformable arm 112 of the lock mechanism 108. FIG. 2 is a sectional view that only depicts one barb 234 and one projection 116B, but in at least one embodiment a second barb on the latch 136 engages the other projection 116A. The U-shaped deformable member 236 is a spring that biases the latch 136 into engagement with the housing 150 to secure the door 132 to the housing 150 when the door 132 is closed. The U-shaped deformable member 236 is positioned in the gap 120 of the deformable arm 112 that is depicted above in FIG. 1, and when the lock mechanism 108 is unlocked a user applies external force to the U-shaped member to move the latch 136 from the closed position depicted in FIG. 2 to a second position that enables the door 132 to be opened while the U-shaped deformable member 236 remains in the gap 120 of the deformable arm 112.

When the deformable arm 112 is in the first position depicted in FIG. 2, the barbs, including barb 234, engage the projections 116A and 116B of the deformable arm 112 and an external force applied in direction 208 that is applied to the latch 136 will either not move the latch 136 or only move the latch 136 by a small distance (e.g. less than 1 mm) that is insufficient to open the door 132. In one embodiment, the barbs 234 and the deformable arm 112 are formed from a material, such as a thermoplastic, with a shape and thickness that provides a resistance to prevent the latch from opening in response to a force of at least 30 Newtons along direction 208 to prevent the latch 136 from opening without damaging any components in the device 100. Other embodiments may provide a lesser or greater amount of resistance based on the materials, sizes, and shapes of the latch and lock mechanism members, including minimum resistance levels in a range of 30 to 100 Newtons as a practical example, although 100 Newtons is not a strict upper limit on the forces that embodiments of the latch and the lock mechanism can withstand.

As depicted in FIG. 2, an external force that is applied to the receiving surface of button 124 as indicated by arrow 204 pushes the deformable arm 112 downward from the first position of FIG. 2 to a second position in the compartment 104. In one embodiment, the first end 114 of the deformable arm 112 has a range of motion of approximately 2 mm between the first position and the second position, although other embodiments can have greater or lesser ranges of motion. In the second position the projections 116A and 116B no longer engage the barbs, including barb 234, on the latch 136, which unlocks the latch. In the example of FIG. 2, the deformable arm 112 moves downward the second position into the compartment 104, but in the direction of movement for the deformable arm 112 can be different (e.g. upward, lateral, or diagonal) in other embodiments. In one embodiment, a force of 1 Newton or greater moves the deformable arm 112 to the second position, although other embodiments move in response to a greater or lesser amount of force based on the stiffness of the deformable arm structure. As depicted in FIG. 2, once the latch 136 is unlocked a second force applied to the latch 136 as indicted by arrow 208 pushes the deformable member 236 in the direction 208 to disengage the latch 136 from the housing 150 to enable the user to open the door 132. To open the door 132, the user maintains the first force to disengage the deformable arm 112 from the latch 136 while applying the second force to open the latch 136. If the user ceases to apply the force to the receiving surface button 124 without opening the door 132, then the spring bias of the deformable arm 112 returns the first end to the first position that is depicted in FIG. 2 to lock the latch 136.

Figure 3:
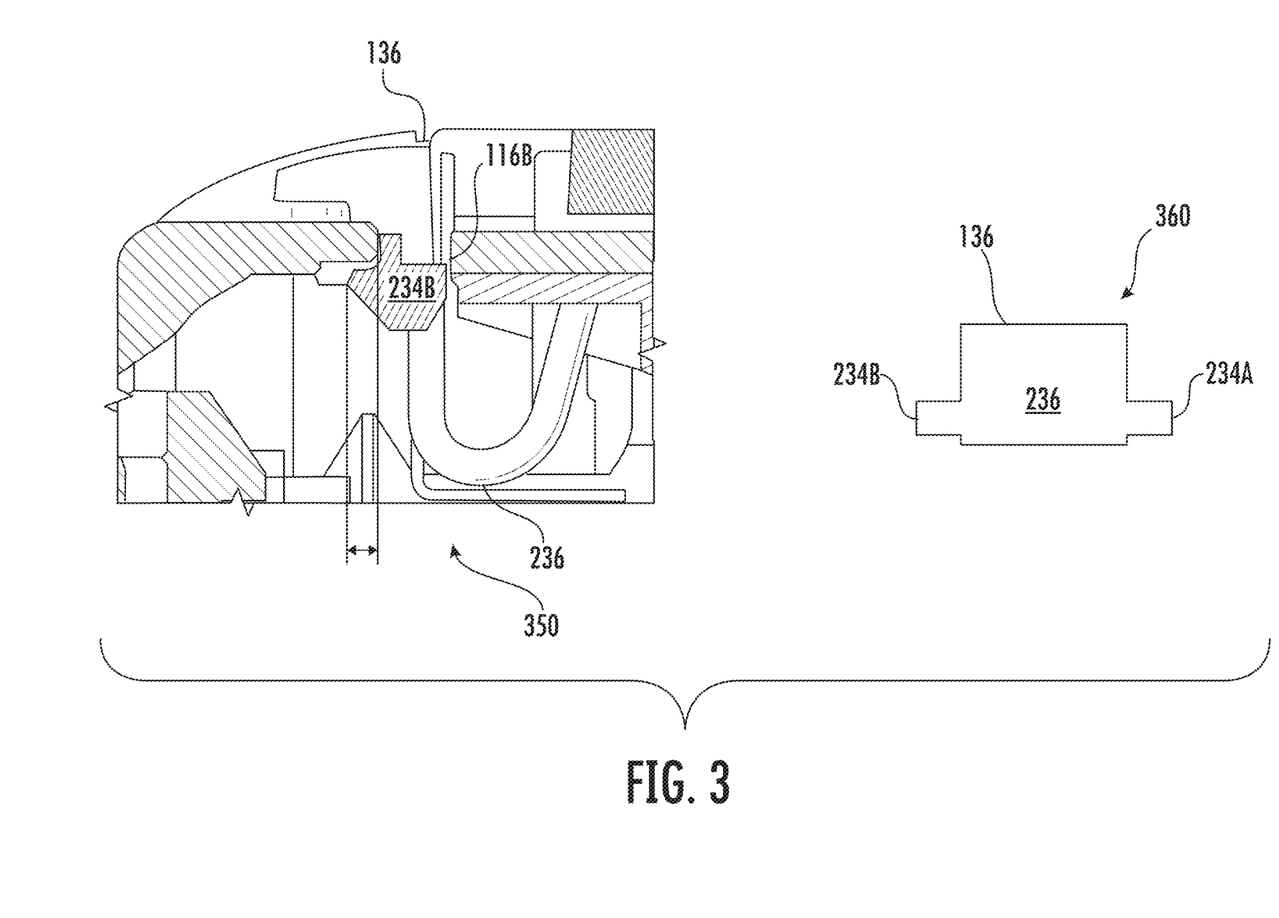
FIG. 3 is a sectional view and a plan view depicting the latch and the lock mechanism in further detail.

FIG. 3 depicts additional details of an embodiment of the latch 136. In FIG. 3, the view 350 depicts the latch 136 in engagement with a barb 234B in engagement the projection 116B of the deformable arm 112. In the embodiment of FIG. 3, the barb 234B is formed with a posterior surface with sufficient size to fully engage the projection 116B in the first end of the deformable arm 112. The view 360 is a simplified plan view of a portion of the latch 136 that depicts the two laterally extending barbs 234A and 234B. As depicted above, the barbs 234A and 234B engage the projections 116A and 116B, respectively, in the deformable arm 112 when the lock mechanism 108 locks the latch 136, and the deformable member 236 in the latch 136 is positioned in the gap 120 between the projections 116A and 116B.

Figure 4:
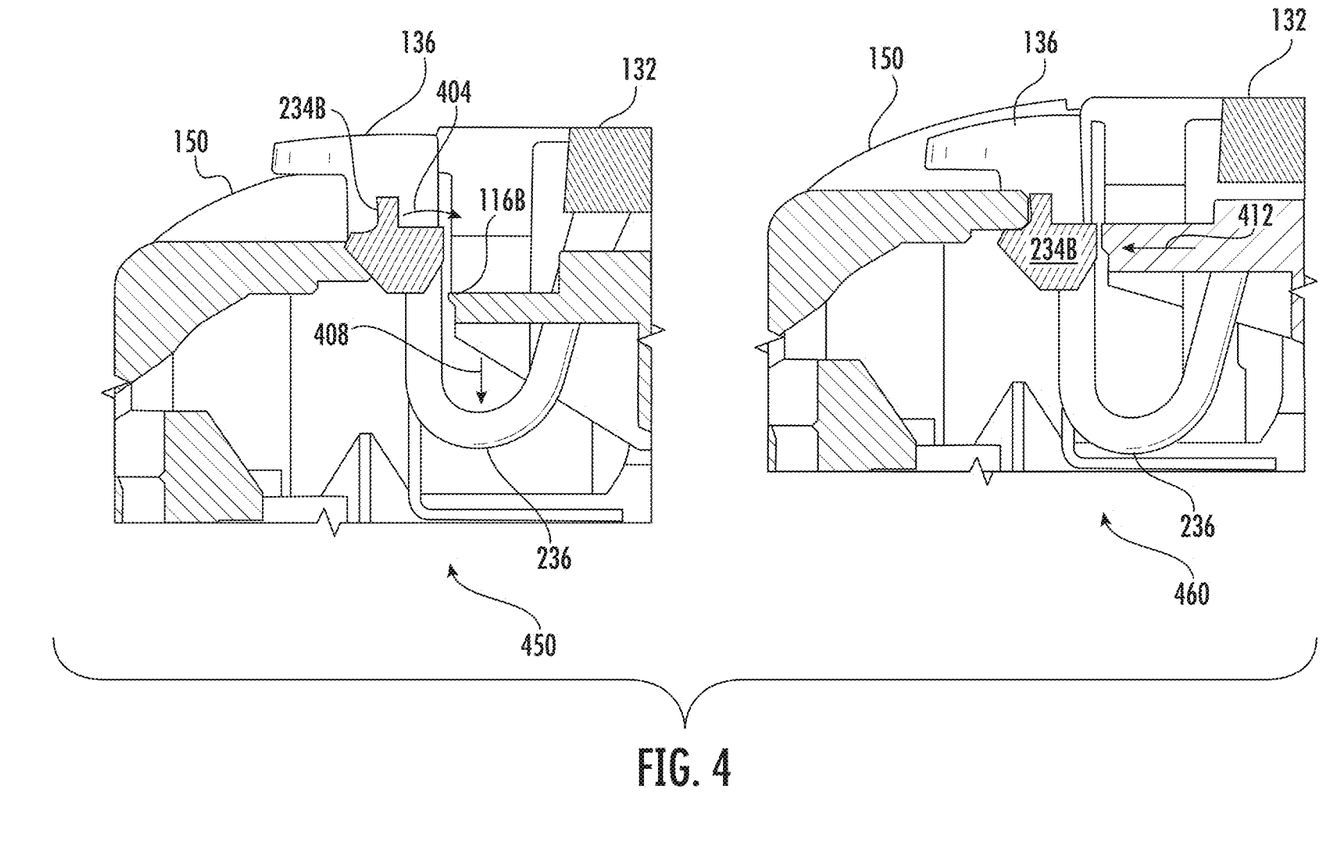
FIG. 4 is a set of views depicting closing of the door and engagement of the latch in the door to the lock mechanism.

In addition to unlocking the lock mechanism and opening the door in the electronic device 100 using the dual action door mechanism, the embodiments described herein also enable closing an opened door using only a single action instead of the dual action operation that is used to open the door. FIG. 4 depicts the operation to close the door in more detail. In view 450 the door 132 is in the process of closing as the latch 136 begins to engage the housing 150. As the latch 136 engages the housing 150, the barb 234B engages the projection 116B in the first end of the deformable arm 112 as depicted by arrow 404 and the barb 234B pushes the deformable arm 112 downward as indicated by arrow 408. While not expressly shown in FIG. 4, the barb 234A also pushes the projection 116A of the deformable arm 112 in a similar manner. Thus, the latch 136 moves the deformable arm 112 as the door 132 closes, and there is no need for a user to apply a separate external force to the deformable arm 112 when closing the door 132 beyond the force used to engage the latch 136 to the housing 150. As depicted in view 460, once the latch 136 has engaged the housing 150 to close the door 132, the barb 234B (and similarly barb 234A) no longer engages the projections 116A and 116B of the deformable arm 112, and the deformable arm 112 returns to the first position to lock the latch 136 in place as indicated by the arrow 412.

Figure 5:
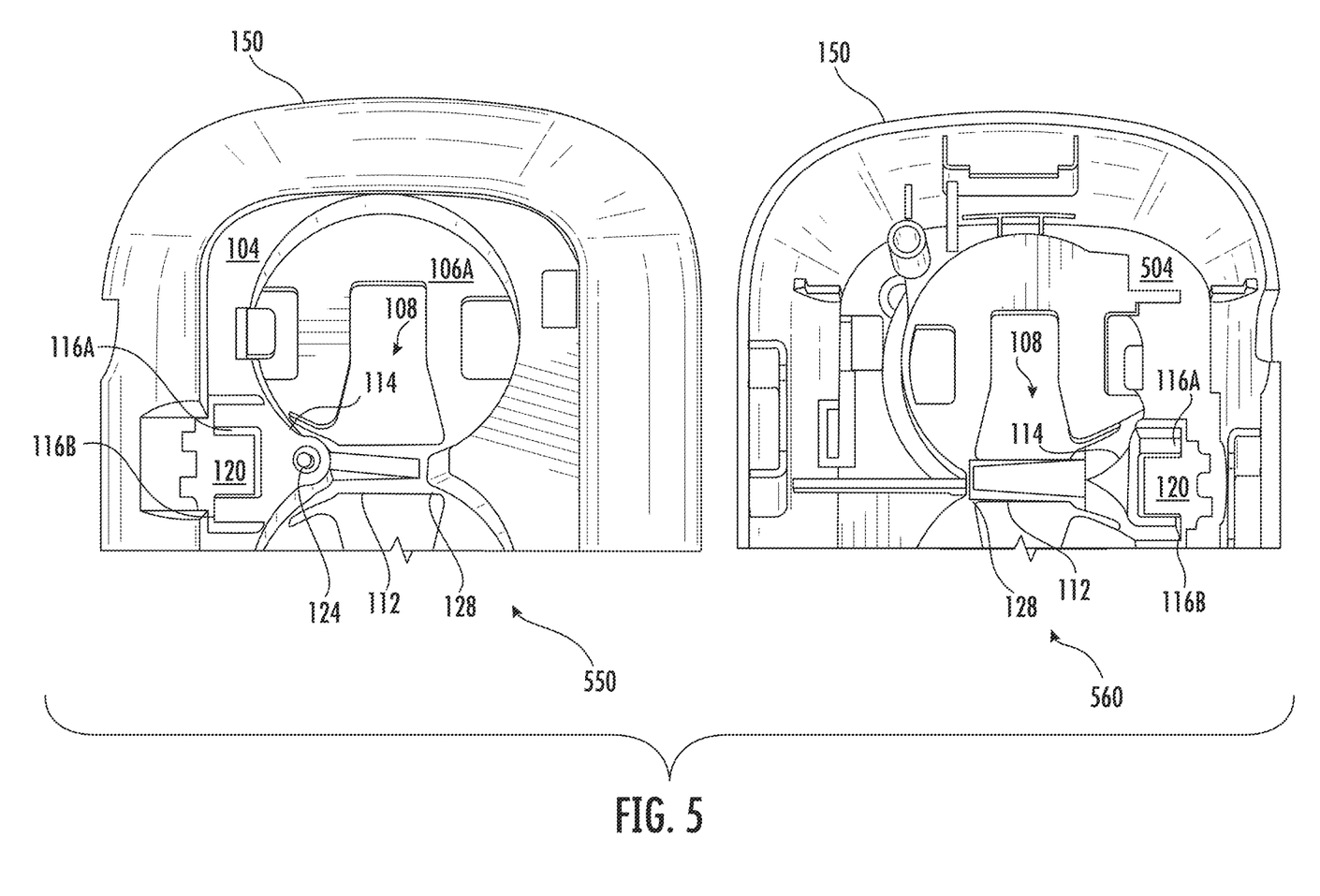
FIG. 5 is a set of top and bottom views of a battery compartment that incorporates a deformable arm in a lock mechanism.

FIG. 5 depicts additional details of an embodiment of the deformable arm 112 in the lock mechanism 108 that is molded from thermoplastic that is integrated with all or a portion of the housing 150. In FIG. 5, view 550 depicts the deformable arm 112 of the lock mechanism 108 from the battery compartment 104 and the view 560 depicts the same elements from the opposing side in a separate electronics compartment 504 that is formed in the housing 150. The deformable arm 112 is affixed to the rest of housing at the second end 128, which forms an attachment point and the fulcrum point to enable the deformable arm 112 to be a cantilever spring with the first end 114 being the free end in the battery compartment 104. In the embodiment of FIG. 5, the housing 150 and the deformable arm 112 are both formed from a thermoplastic, such as the thermoplastic compounds that are sold commercially as Lexan or as another suitable polymer composition. During formation, molten thermoplastic flows through a mold and forms the deformable arm 112 starting from the second end 112 and extending to the first end 114 and the projections 116A and 116B.

Figure 6:
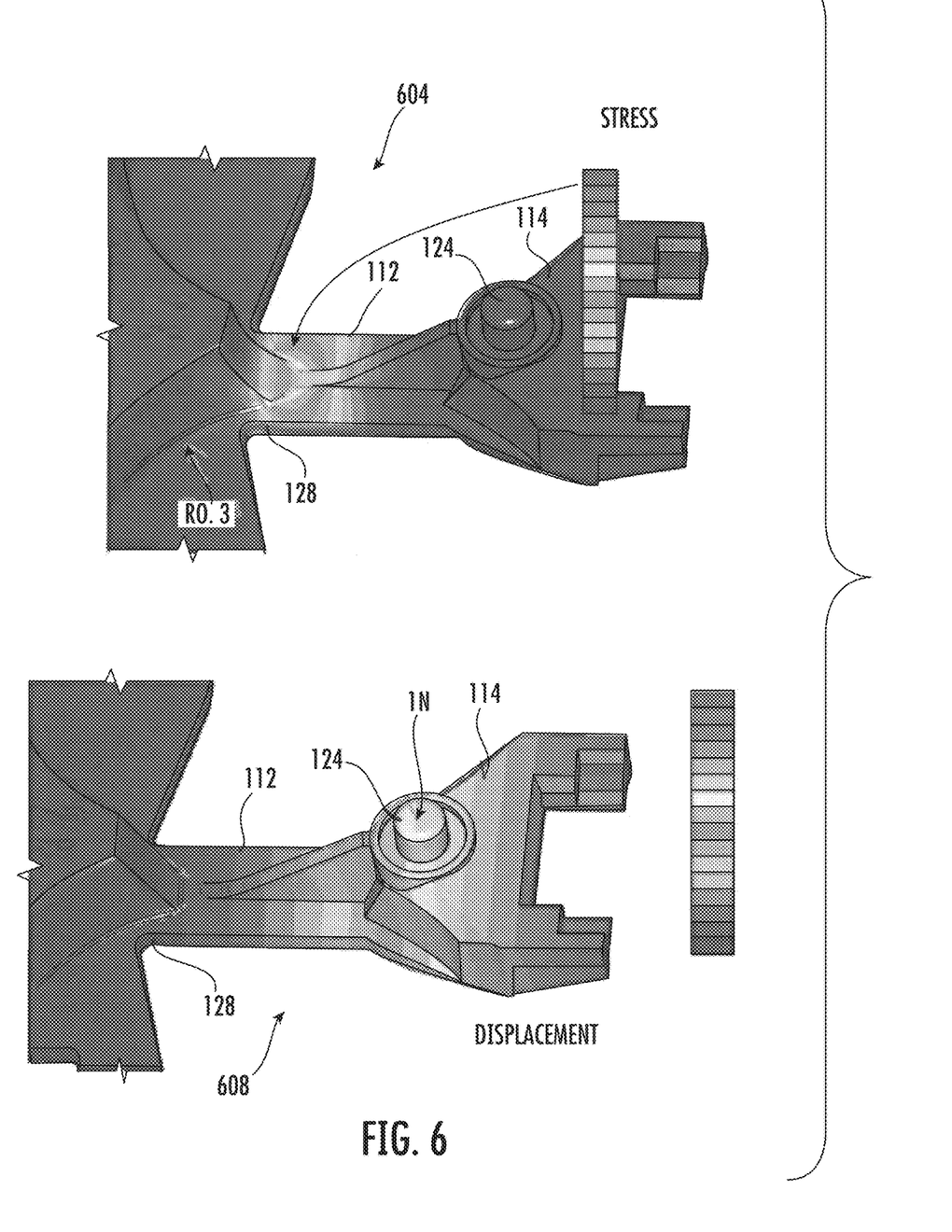
FIG. 6 is a set of finite element analysis views depicting stress and displacement of the deformable arm in the lock mechanism.
Figure 7:
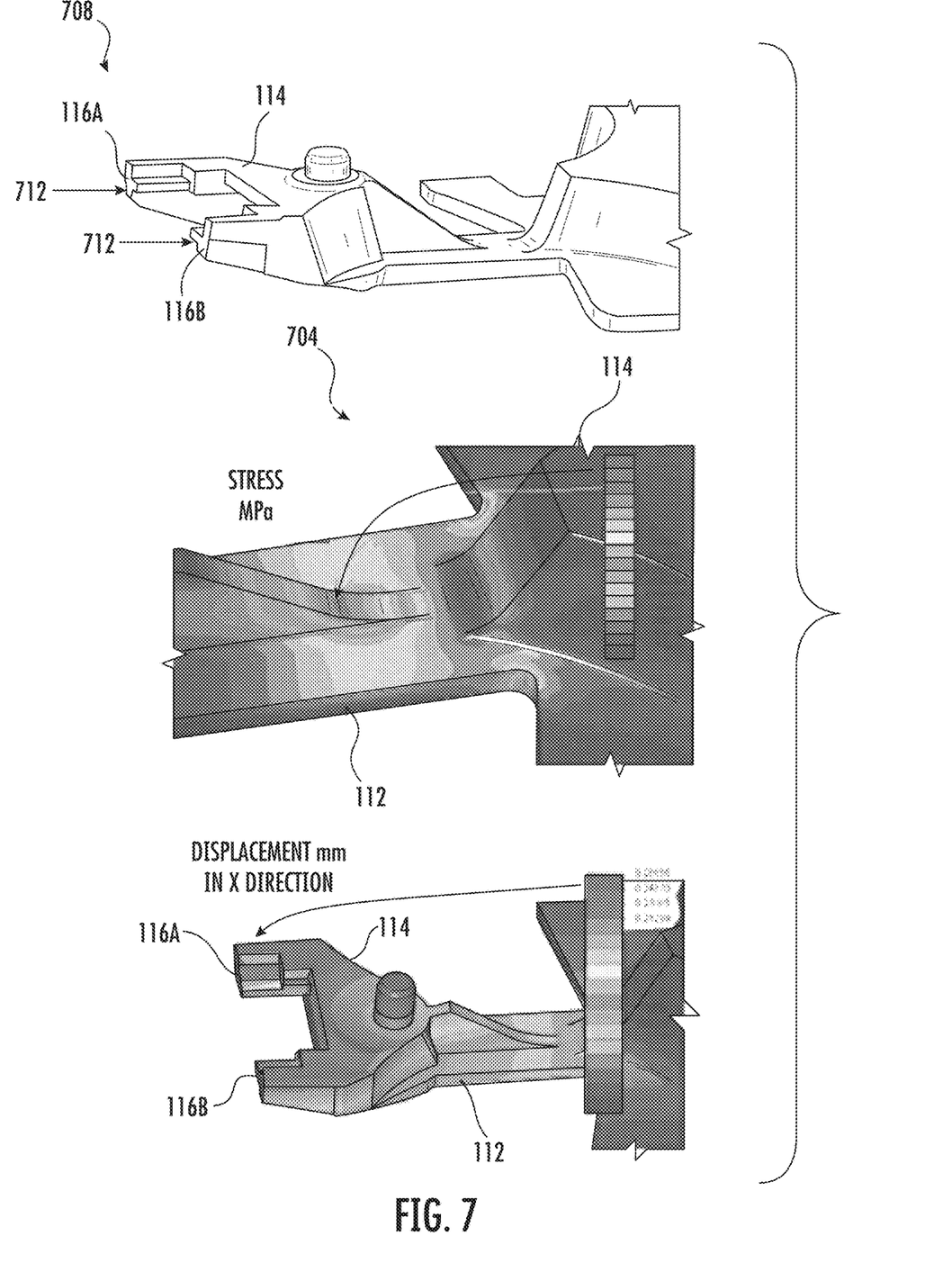
FIG. 7 is another set of finite element analysis views depicting stress and displacement of the deformable arm in the lock mechanism.

FIG. 6 and FIG. 7 depict finite element analysis (FEA) results for different sections of the deformable arm 112 during operation. View 604 of FIG. 6 depicts the stress experienced at the second end 128 of the deformable arm 112 when an external force is applied to the receiving surface 124 to move the deformable arm 112 from the first position to the second position. View 608 of FIG. 6 depicts the displacement experienced by the first end 114 of the deformable arm in response to a 1 Newton external force and more generally to a force in a range of greater than 0 Newtons to 10 Newtons is sufficient to move the first end 114 of the deformable arm 112 from the first position to the second position. View 704 of FIG. 7 depicts the stress that the deformable arm 112 experiences when the lock mechanism 108 is locked and an external force is applied that attempts to open the latch, which the deformable arm 112 prevents as long as the external force is below a maximum loading level (e.g. a range of 30 Newtons to 100 Newtons, or another set maximum force level). View 708 depicts the displacement of the first end 114 of the deformable arm 112 as the force from the latch 136 (depicted as arrows 712) is applied to the projections 116A and 116B.

Figure 8:
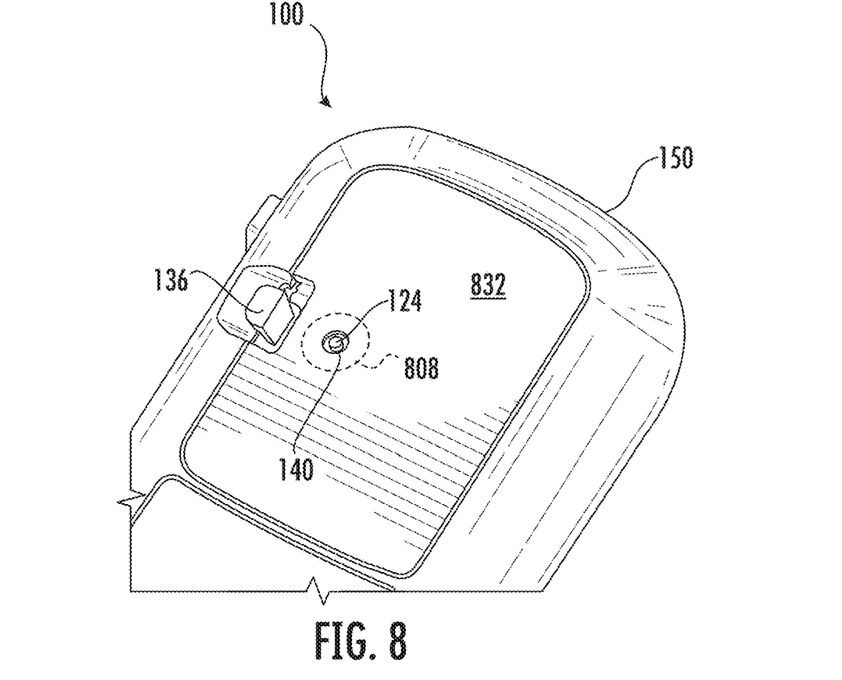
FIG. 8 is a view of an embodiment of a door for the compartment that is includes a depression to enable manual operation of the lock mechanism.

FIG. 8 depicts the electronic device 100 with another embodiment of a door 832. The door 832 includes the same latch 136 that is included in the door 132 described above, and further includes a depression 808 that is formed around the opening 140. While FIG. 8 depicts the depression 808 formed around the opening 140 in the door 832, in another embodiment that includes the opening formed in the housing of the compartment, a depression can be formed in the housing or be formed in both the housing and the door. The depression 808 enables the receiving surface button 124 of the deformable arm 112 to extend through and above the opening 140, which simplifies manual operation of the button 124 by a user since the depression 808 provides sufficient clearance for the user to push the button 124 downward using a finger. By contrast, manual operation without an implement is often impractical in the embodiments described above with the door 132 that does not include a depression and where the receiving surface of the button 124 does not extend through the opening 140. The depression 808 also enables manual access to the receiving surface button 124 while the upper end of the receiving surface button 124 remains at or below the surface level of the remainder of the door 832 that is outside of the depression 808, which protects the button 124 from damage or from snagging in the pocket or other carrier of the user.

Figure 9:
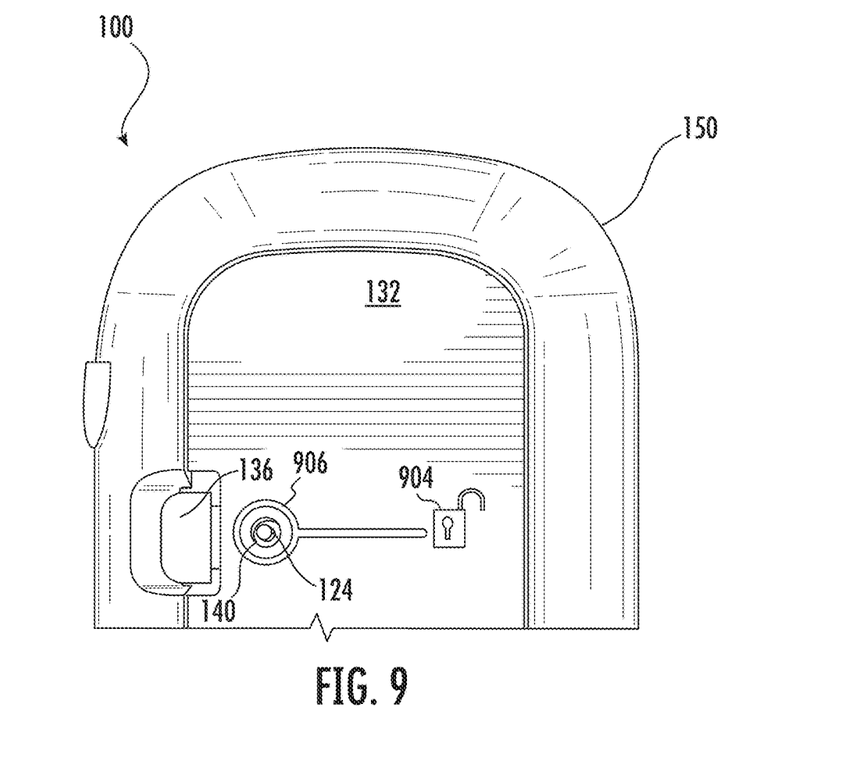
FIG. 9 is a view of an embodiment of a door for the compartment that includes indicia to assist a user in operating the dual action door mechanism.

FIG. 9 depicts an embodiment of the door 132 that includes indicia formed on the surface of the door 132 to assist the user in operating the lock mechanism 108 to unlock the latch 136. In FIG. 9, the icon 904 indicates the unlocking operation and the guide symbol 906 surrounds the opening 140 in the door 132 and the receiving surface of the button 124 that receives the external force from the user to unlock the latch 136. As described above, the embodiments herein enable the user to unlock the latch 136 either manually in the embodiment of door 832 of FIG. 8 or using a simple implement such as the end of a ballpoint pen or other article without the need for a specialized tool such as a specific type of screwdriver in the door embodiment 132 of FIG. 9 and the other figures. Furthermore, the dual action door mechanism that includes the lock mechanism 108 and the latch 136 reduces or prevents access to the battery compartment 104 by unauthorized users, such as children, since these users are generally unable to perform the concurrent unlocking and unlatching actions of the dual action door mechanism. Additionally, as described above, closing the door after the door has been opened does not require any additional actions beyond latching the door in the opening of the compartment.

While the embodiments described herein depict a battery compartment for illustrative purposes, the lock mechanisms described herein may be used with dual action door mechanism for other types of compartments as well. One non-limiting example of another type of compartment is a compartment that holds medication for a patient. The medication compartment can be part of an electronic or non-electronic medication container device, and the embodiments described herein can prevent unauthorized access to medication in the compartment in the same manner as described above for preventing unauthorized access to a battery in a battery compartment.

It will be appreciated that variants of the above-described embodiments and other features and functions, or alternatives thereof, may be desirably combined into many other different systems, apparatuses, applications, or methods. Various presently unforeseen or unanticipated alternatives, modifications, variations or improvements may be subsequently made by those skilled in the art that are also intended to be encompassed by the following claims.

What is claimed is:

1. A lock mechanism for a compartment comprising:
a deformable arm affixed to a housing of the compartment and positioned within the compartment, the deformable arm comprising:
a first end configured to be biased into a first position to engage a latch of a door of the compartment to prevent the latch from opening, the first end further comprising:
a first projection configured to engage a first barb formed in the latch; and
a second projection configured to engage a second barbed formed in the latch, the first projection being offset from the second projection to enable a deformable member in the latch to be positioned between the first projection and the second projection; and
a receiving surface configured to receive an external force to move the deformable arm to a second position that disengages the first end from the latch to enable opening of the latch while the external force is applied to the receiving surface.

2. The lock mechanism of claim 1, the receiving surface further comprising:
a button extending from the deformable arm, the button being configured to receive the external force through an opening formed in at least one of the housing or the door.

3. The lock mechanism of claim 2, wherein the button is configured to extend through the opening.

4. The lock mechanism of claim 1, wherein the deformable arm comprises a cantilever spring in which the first end of the deformable arm is a free end and a second end of the deformable arm is affixed to the housing of the compartment.

5. The lock mechanism of claim 1, wherein the deformable arm comprises a thermoplastic that is integrated with the housing of the compartment.

6. The lock mechanism of claim 1, wherein the deformable arm in the first position prevents the latch from opening in response to a force in a range of 30 Newtons to 100 Newtons being applied to the latch.

7. The lock mechanism of claim 1, wherein the deformable arm is configured to move from the first position to the second position in response to a force in a range of greater than 0 Newtons to 10 Newtons being applied to the receiving surface.

8. The lock mechanism of claim 1, wherein the compartment is a battery compartment.

9. A compartment with a lock mechanism comprising:
a housing forming the compartment;
an opening in the housing providing access to the compartment;
a door configured to engage the opening in the housing to prevent access to the compartment when closed and to provide access to the compartment when opened, the door further comprising:
a latch, the latch comprising a latch member configured to move between a latched position to hold the door closed in engagement with the housing and an unlatched position to enable the door to be opened, the latch further comprising:
a deformable member configured to bias the latch into the latched position;
a first barb connected to the deformable member; and
a second barb connected to the deformable member; and
the first end of the deformable arm further comprising:
a first projection configured to engage the first barb; and
a second projection configured to engage the second barb, the first projection being offset from the second projection to enable the deformable member of the latch to be positioned between the first projection and the second projection; and
a deformable arm affixed to the housing of the compartment and positioned within the compartment, the deformable arm comprising:
a first end configured to be biased into a first position to engage the latch to prevent the latch from moving from the latched position to the unlatched position; and
a receiving surface configured to receive an external force to move the deformable arm to a second position that disengages the first end from the latch to enable the latch to be moved to the unlatched position while the external force is applied to the receiving surface.

10. The compartment of claim 9, the receiving surface further comprising:
a button extending from the deformable arm, the button being configured to receive the external force through an opening formed in at least one of the housing or the door.

11. The compartment of claim 10, wherein the button is configured to extend through the opening.

12. The compartment of claim 11, at least one of the door or the housing further comprising:
a depression formed around the opening to enable an external manual force to be applied to the button to move the deformable arm from the first position to the second position.

13. The compartment of claim 9, wherein the deformable arm comprises a cantilever spring in which the first end of the deformable arm is a free end and a second end of the deformable arm is affixed to the housing of the compartment.

14. The compartment of claim 9, wherein the deformable arm comprises a thermoplastic that is integrated with the housing of the compartment.

15. The compartment of claim 9, wherein the deformable arm in the first position prevents the latch from opening in response to a force in a range of 30 Newtons to 100 Newtons being applied to the latch.

16. The compartment of claim 9, wherein the deformable arm is configured to move from the first position to the second position in response to a force in a range of greater than 0 Newtons to 10 Newtons being applied to the receiving surface.

17. The compartment of claim 9, wherein the compartment is a battery compartment.

* * * * *